United States Patent [19]

Petrosky

[11] Patent Number: 4,782,258
[45] Date of Patent: Nov. 1, 1988

[54] HYBRID ELECTRO-PNEUMATIC ROBOT JOINT ACTUATOR

[75] Inventor: Lyman J. Petrosky, Unity Township, Westmoreland County, Pa.

[73] Assignee: Westinghouse Electric Corp., Pittsburgh, Pa.

[21] Appl. No.: 113,845

[22] Filed: Oct. 28, 1987

[51] Int. Cl.⁴ .................. H02K 7/00; G05B 11/00
[52] U.S. Cl. .................. 310/119; 310/112; 417/374; 418/267; 901/22; 901/23
[58] Field of Search .............. 192/60; 310/96, 112, 310/118, 119, 266, 268; 417/352, 353, 354, 374; 418/248, 249, 267, 270; 901/22, 23, 24

[56] References Cited

U.S. PATENT DOCUMENTS

| | | | |
|---|---|---|---|
| 3,348,490 | 10/1967 | Katz et al. ........................ | 103/87 |
| 3,609,071 | 9/1971 | Brown ............................ | 418/267 |
| 4,188,166 | 2/1980 | Moreau et al. ................... | 414/735 |
| 4,398,110 | 8/1983 | Flinchbaugh et al. ............ | 310/83 |
| 4,442,387 | 4/1984 | Lindbom ......................... | 318/568 |
| 4,551,073 | 11/1985 | Schwab .......................... | 417/352 |
| 4,589,816 | 11/1986 | Eberle et al. ................... | 414/680 |
| 4,606,707 | 8/1986 | Kumata .......................... | 417/354 |

FOREIGN PATENT DOCUMENTS 525541 8/1976 U.S.S.R. .
641397 5/1979 U.S.S.R. .

OTHER PUBLICATIONS

U.S. Army AMCCOM Proposal.

Primary Examiner—Patrick R. Salce
Assistant Examiner—D. L. Rebsch

[57] ABSTRACT

A hybrid robotic joint actuator utilizing both the quick response time of an electric motor and the high torque capacity of a pneumatic motor. In one preferred embodiment, the hybrid motor includes a pneumatic rotor coupled to an electric rotor in a common stator housing.

5 Claims, 3 Drawing Sheets

HYBRID ELECTRO-PNEUMATIC ROBOT JOINT ACTUATOR

FIELD OF THE INVENTION

The present invention relates to drive systems used for robot joint actuation, specifically, hybrid motors.

BACKGROUND OF THE INVENTION

The majority of current robot designs use electric drives for joint actuation. In recent years direct drive motors have been used to achieve increased performance. Unfortunately, these motors suffer from overheating when holding or moving large loads. Often very large motors are needed to obtain a reasonable "continuous" torque rating. Large robots often use hydraulic or pneumatic drives to obtain higher powers. But these systems have slow response times and poor accuracy (except at very low speeds). It would be desirable to have a drive system which could deliver moderate power with good response and accuracy.

SUMMARY OF THE INVENTION

The present invention provides a drive system comprising both an electric drive and a pneumatic drive. This hybrid drive system solves the above-identified problems by preferably combining an electric motor and a pneumatic motor. Preferably, the electric motor provides 10 to 20% of the rated continuous torque of an actuator and the pneumatic motor provides up to 100% of the rated continuous torque of the actuator. A controller continuously adjusts the torque applied by the pneumatic motor so that the load of the electric motor is decreased to avoid overheating the electric motor. During transient motion, the controller causes the difference between the pneumatic motor torque and the desired torque to be provided by the electric motor. The transient torque rating of the electric motor is generally seven (or more) times the continuous torque rating. Therefore the electric motor can, for short periods, provide in excess of 70% of the rated torque.

The hybrid drive system of the present invention exhibits an overall torque rating greater than the continuous rating of the electric motor while maintaining the high response rate typical of electric drive systems. In addition, the hybrid motor can support large loads for extended periods of time with minimal electric motor heating. Further, the hybrid motor is an inherently "soft" actuator, i.e., one with low effective stiffness. The joint stiffness is a function of the servo loop gain of the electric motor of the drive system. This gain may be set over a wide range of values and it is therefore possible to adjust the dynamics of the drive system to an optimal stiffness value for the robot joint.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which.

DETAILED DESCRIPTION OF THE INVENTION

Figure 1:
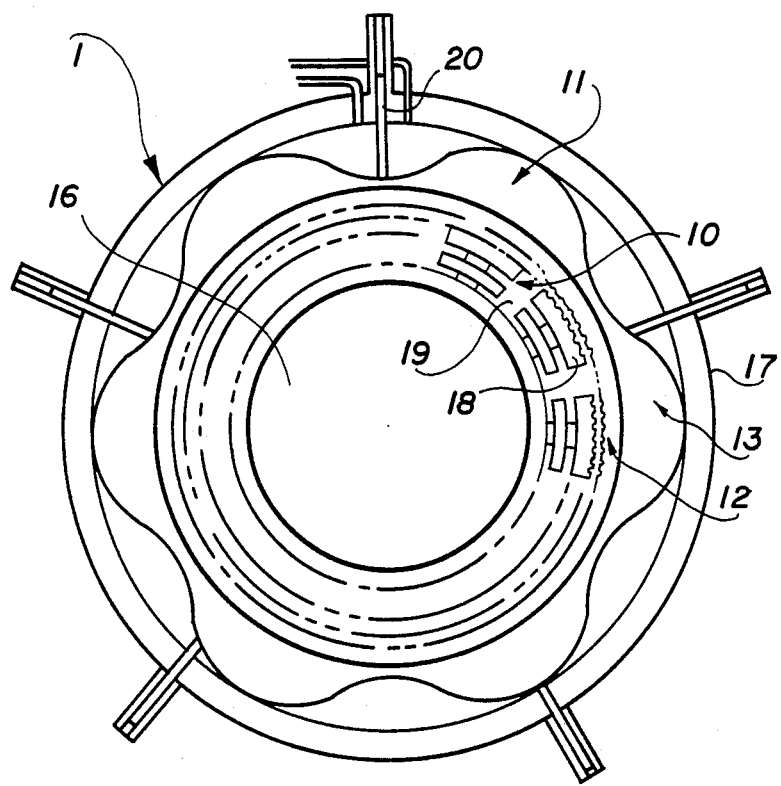
FIG. 1 illustrates a cross sectional view of one preferred embodiment of the hybrid drive.
Figure 2:
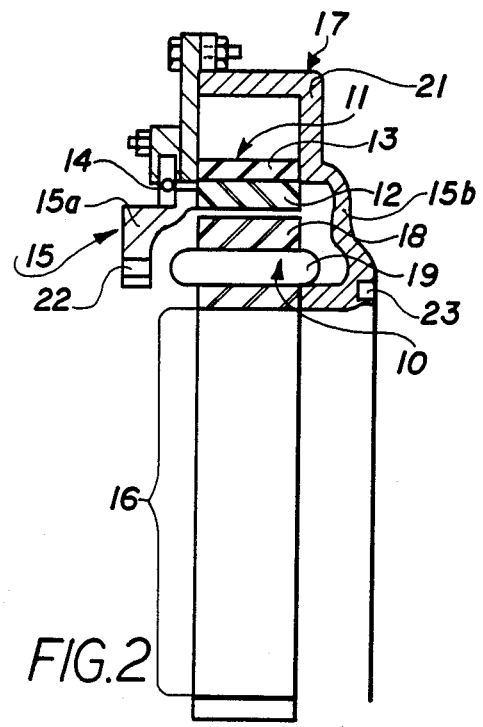
FIG. 2 illustrates a cross section elevation view of one preferred embodiment of the hybrid drive.

In one preferred embodiment of the hybrid drive shown in FIGS. 1 and 2, the hybrid motor, generally 1, consists of an electric direct drive motor 10 comprising an electric rotor 12 and an electric stator 18, and a pneumatic vane motor 11 comprising a pneumatic rotor 13 and a pneumatic stator, in a common housing 17. As shown, the electric rotor 12 of the electric motor 10 is coupled to the pneumatic rotor 13 of the pneumatic motor 11 such that the two rotors share the load of the hybrid motor. The electric rotor 12 engages an electric stator 18 having a winding 19.

The hybrid motor preferably is supported by a precision ring bearing 14 and is connected to the output hub 15. The output hub 15 comprises a left hub 15a and a right hub 15b. The left hub 15a has a mounting hole 22 and the right hub 15b has a mounting hole 23. In one preferred embodiment of the hybrid motor shown in FIG. 2, the pneumatic rotor 13 and electric rotor 12 are mounted to the left output hub 15a, while the electric stator 18, and the outer frame 21 of the housing 17 form the fixed portion of the hybrid motor which is supported by the right hub 15b.

At the center of the motor is a large hole 16 which can be used to route cables between the links of the robot. This arrangement thereby also incorporates the robot joint into the motor housing. In the arrangement shown in FIG. 1, the housing 17 forms the stator for the pneumatic motor 11 such that the stator is integral with the housing 17. As shown, the pneumatic motor is a vane type, having several (4 to 10) vanes 20.

The hybrid actuator as described forms both the joint and actuator for a robotic linkage. When properly controlled, the hybrid drive is significantly lighter and more compact than a pure electric drive of the same torque rating. It is also faster and more precise than a hydraulic or pneumatic drive.

The hybrid drive preferably includes a controller which continuously adjusts the torque applied by the pneumatic motor so that the electric motor's load is decreased to avoid overheating. The controller also adjusts the torque of the electric motor so the electric motor can compensate for torque deficiencies of the pneumatic motor due to slow response time, and torque inaccuracies resulting from tracking errors. A conventional algorithm of the form:

Command $T_{elec} = T_r - T_p + T_{err}$ where Command $T_{elec}$ represents the desired torque of the electric motor, $T_r$ represents the target required torque of the hybrid drive, $T_p$ represents the torque of the pneumatic or hydraulic motor and $T_{err}$ represents the tracking error, is used by the controller to continuously adjust the torque of the electric motor. $T_{err}$ is a corrective value which compensates for inherent tracking errors and tracking errors due to pneumatic lag while $T_p$ is a measured quantity.

Figure 3:
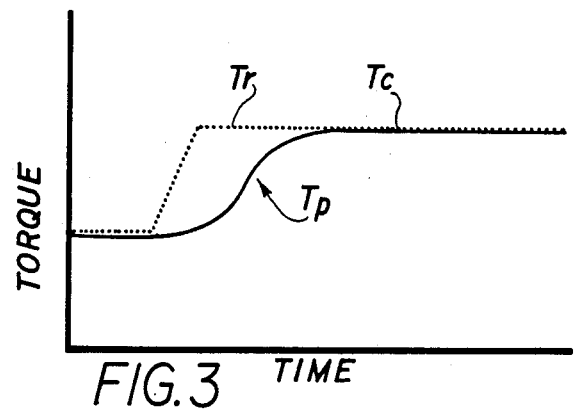
FIG. 3 is a plot of torque versus time for a typical pneumatic motor.

FIG. 3 illustrates the torque $T_p$ applied over time to a load by a typical pneumatic or hydraulic motor. The desired or target required torque is shown as $T_r$. As shown, the torque $T_p$ rises gradually until it reaches the continuous torque rating of the motor represented by $T_c$. The pneumatic motor is continuously able to supply this amount of torque to the load.

Figure 4:
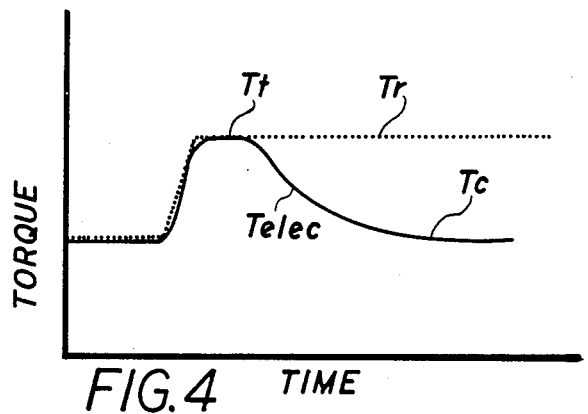
FIG. 4 is a plot of torque versus time for a typical electric motor.

FIG. 4 illustrates the torque $T_{elec}$ applied over time to a load by a typical electric motor. Again, the desired or target required torque is shown as $T_r$. As shown, the torque $T_{elec}$ rises more rapidly than the torque $T_p$ of the pneumatic motor, to a level $T_t$ called the transient torque rating. This level can only be maintained for a short period of time before the electric motor overheats. For this reason, the power to the electric motor must be cut back after only about 1-5 seconds. This reduces the torque to its continuous rating $T_c$. Generally, the transient torque rating $T_t$ is greater than or equal to seven times the continuous torque rating $T_c$.

Figure 5:
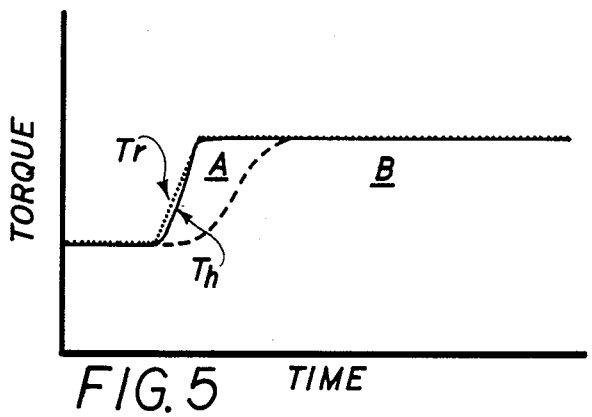
FIG. 5 is a plot of torque versus time for a hybrid drive.

FIG. 5 illustrates a plot of torque $T_h$ versus time for a hybrid motor. As shown, in region A of FIG. 5, the electric motor is used to quickly achieve the required torque, $T_r$, and this torque is maintained by the pneumatic motor, which, as represented in region B of FIG. 5, is slower to respond, but able to maintain the required torque.

When a computer is used to control a robot actuator, the computer is capable of calculating the required torque prior to actuation. Generally, the torque required to actuate the joint of a robot is a constantly changing value along the path of motion, varying as a function of time and/or distance of the path taken by the part of the robot which is moved.

According to a preferred embodiment of the hybrid drive, the constantly changing values of required torque are fed to the controller which in turn activates the pneumatic motor. For relatively slow changes in torque, the pneumatic motor is capable of achieving the required torque without assistance from the electric motor. The pneumatic motor can thus provide up to 100% of the continuous rating of the actuator. However, where the changes in required torque are sharp and/or rapid, the pneumatic motor cannot respond quickly enough to meet the required torque, and thus there occurs a temporary torque deficiency in the actuator. At this point, the controller summons the electric motor to provide the additional torque by which the pneumatic motor is temporarily deficient, and also causes the electric motor to provide torque as needed to compensate for tracking errors. In one preferred embodiment of the hybrid drive, the electric motor provides 10 to 20% of the rated continuous torque of the actuator. The controller constantly adjusts the torques of the pneumatic and electric motors to avoid overheating the electric motor, by increasing the torque of the pneumatic motor and decreasing the torque of the electric motor.

A hybrid drive can also be constructed by reversing the orientation of FIG. 1, i.e., by placing the pneumatic motor at the center and the electric motor outside of it. The pneumatic motor need not be of a vane type construction. Numerous other pneumatic motor configurations can be adapted into a hybrid design. In fact, the nonelectric motor need not be pneumatic. For example, certain hydraulic systems could satisfy the torque requirements of a robot joint actuator. Similarly, any type of electric motor may be used, whether it be a.c., d.c., inductance, etc., so long as it is able to satisfy the torque requirements of the particular unit.

The hybrid drive may have its electric and nonelectric components coupled in various ways and the components need not necessarily occupy a common housing. For example, the pneumatic rotor may be physically coupled to the electric rotor in a direct relationship, or may be coupled through gearing means. The electric stator could be an integral part of the housing.

Although the invention has been described in detail in the foregoing for the purpose of illustration, it is to be understood that such detail is solely for that purpose and that variations can be made therein by those skilled in the art without departing from the spirit and scope of the invention as described by the following claims.

I claim:

1. A hybrid drive comprising;
   a. a housing;
   b. a first rotor within said housing, said first rotor comprising a pneumatic rotor, said housing including a pneumatic stator, said pneumatic rotor and pneumatic stator comprising a pneumatic motor;
   c. a second rotor coupled to said first rotor, such that the first and second rotors share the load of said hybrid motor, said second rotor comprising an electric rotor, and said hybrid motor further including an electric stator which engages said electric rotor, said second rotor and electric stator comprising an electric motor;
   d. a controller which continuously adjusts the torque applied by the pneumatic motor so that the electric motor's load is decreased so as to prevent overheating the electric motor, and said controller further adjusts the torque of the electric motor to compensate for torque deficiencies of the pneumatic motor.

2. The hybrid motor of claim 1 wherein said electric motor and said pneumatic motor occupy a common housing.

3. The hybrid motor of claim 1 wherein said pneumatic stator is integral with said housing.

4. The hybrid motor of claim 1 wherein said pneumatic motor is a pneumatic vane motor.

5. The hybrid motor of claim 1 wherein said electric motor is a direct drive motor.

* * * * *